United States Patent [19]
VanDeVyvere

[11] Patent Number: 5,048,553
[45] Date of Patent: Sep. 17, 1991

[54] RELIEF VALVE WITH OVERTURN SURGE CONTROL FOR STORAGE TANK

[75] Inventor: Bryan E. VanDeVyvere, Lees Summit, Mo.

[73] Assignee: Knappco Corporation, Kansas, Mo.

[21] Appl. No.: 611,076

[22] Filed: Nov. 9, 1990

[51] Int. Cl.$^5$ .................. F16K 17/10; F16K 17/36
[52] U.S. Cl. .................. 137/43; 137/514.3; 220/203
[58] Field of Search .............. 137/38, 39, 43, 514.3; 220/203

[56] References Cited

U.S. PATENT DOCUMENTS

| | | | |
|---|---|---|---|
| 4,508,131 | 4/1985 | DeFrees | 137/43 |
| 4,555,041 | 11/1985 | Muehl | 220/204 |
| 4,763,688 | 8/1988 | Morris | 137/509 |
| 4,766,929 | 8/1988 | Yaindl | 137/514.3 |

Primary Examiner—Robert G. Nilson
Attorney, Agent, or Firm—Silverman, Cass & Singer, Ltd.

[57] ABSTRACT

A tank valve apparatus including a sealed piston assembly for regulating movement of a spring biased poppet, the poppet being in cooperative engagement with the sealed piston assembly and a valve seat of an associated valve opening, the valve opening being in communication with ambient atmosphere and pressure within the tank so that the poppet can be activated by a predetermined pressure developed within the tank to overcome the spring bias and vent the pressure to ambient atmosphere. The piston assembly includes a piston head and a flow path through the piston head for flow of material therethrough within a closed piston chamber which encloses the piston head. A snubber valve assembly is included which is carried by the piston head and contained within the closed piston chamber. The snubber valve assembly includes a shut-off disc for momentarily closing the flow path of the piston head during initial overturn of the tank thereby momentarily preventing movement of the piston head within the chamber which in turn restricts movement of the poppet and prevents venting of any surge pressure built up within the tank during the overturn. The snubber valve assembly also includes a member for moving the shut-off disc to open the flow path after a predetermined time period during which any surge pressure is dissipated within the tank in order to permit movement of the piston assembly and the poppet and venting of the valve.

8 Claims, 3 Drawing Sheets

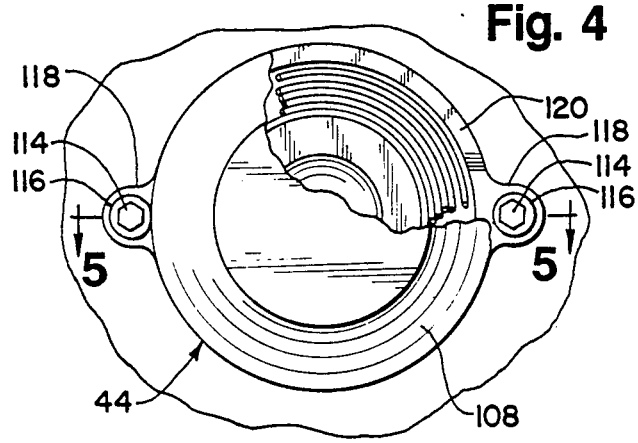
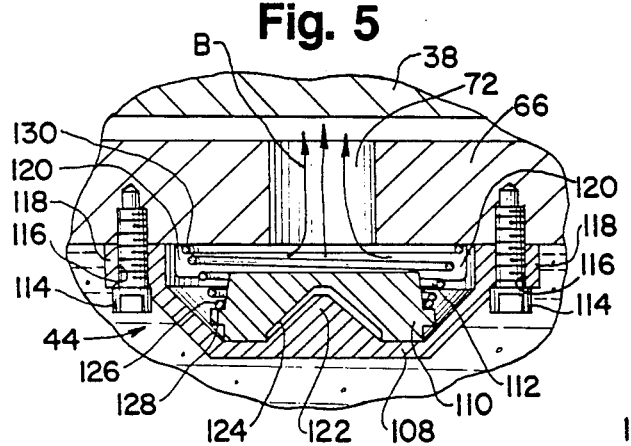
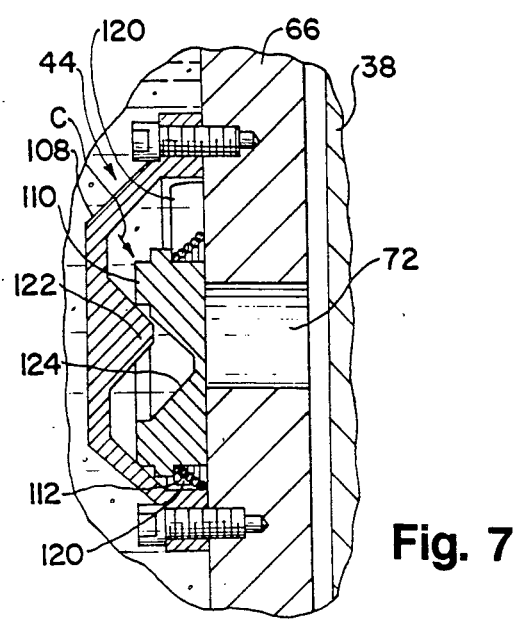
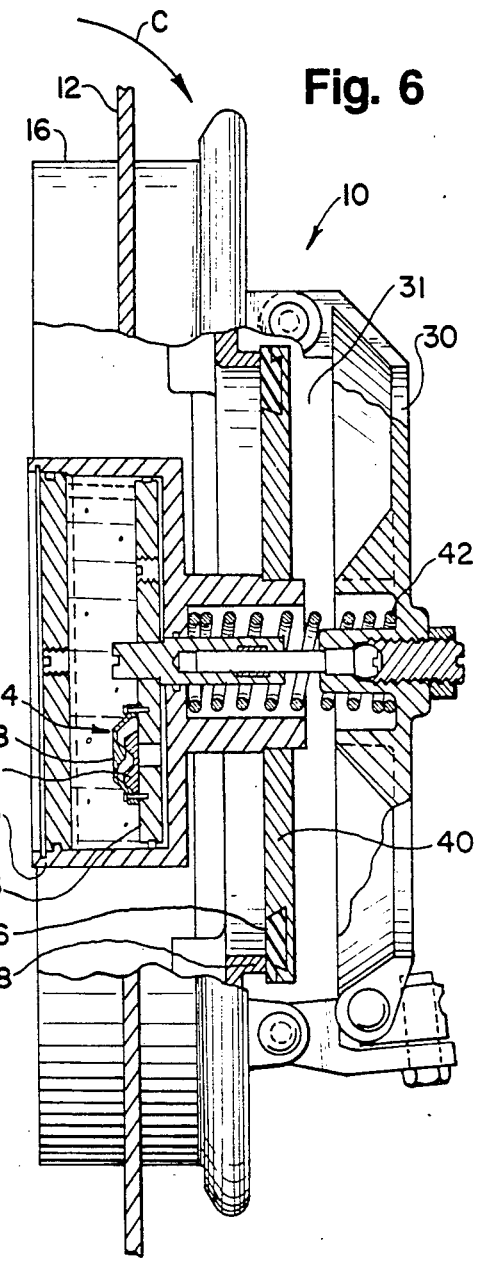

RELIEF VALVE WITH OVERTURN SURGE CONTROL FOR STORAGE TANK

FIELD OF THE INVENTION

This invention relates generally to pressure relief valves for storage tanks, and more particularly, to a relief valve for a fluid storage tank which includes a snubber surge valve assembly which prevents the relief valve from venting to atmosphere for a short period of time when the relief valve is subjected to a sudden or rapid surge pressure created within the storage tank during overturn of the tank.

BACKGROUND OF THE INVENTION

Storage tanks for retaining liquids, particularly flammable or corrosive liquids, typically are provided with pressure relief valves which limit the internal pressure within the tank to a predetermined value for safety. When the pressure inside the tank rises slowly as in normal storage of flammable liquids, such relief valves automatically open at a predetermined pressure value to relieve the excess pressure within the tank by venting to atmosphere. When the pressure inside of the tank is reduced below the predetermined pressure value, the relief valve automatically closes and maintains pressure within the tank below the predetermined value.

During storage, use and transportation of such tanks, overturns of the tank frequently occur, such as a tank falling over or a tanker truck rolling over in an accident. During such overturns, a very sudden liquid surge develops internal pressures within the tank which are of an extremely high value and have a relatively short duration. For example, for some liquids, an overturn can create a sudden liquid surge lasting as little as two milliseconds which can develop internal pressures on the order of fifty pounds per square inch which can persist within the tank for approximately fifty milliseconds.

Such excess surge pressures in a typical storage tank and relief valve assembly can lead to a release of large quantities of liquid from the tank by either blowing the relief valve itself or a hatch, such as a manhole cover, off the tank. Alternatively, if the relief valve assembly and other hatches hold, significant quantities of liquid may be sprayed out of the venting relief valve which can create a gaseous fog in the vicinity of the tank.

Relief valves which address such surge problems are illustrated, for example, in U.S. Pat. Nos. 4,555,041 and 4,763,688, both of said patents being owned by the assignee of the present application. U.S. Pat. No. 4,555,041, which is incorporated herein by reference, discloses an inertia valve which prevents the relief valve from opening for as long as the tank remains overturned. U.S. Pat. No. 4,763,688 provides a snubber surge valve assembly for a relief valve which impedes the rate at which pressure can build within the relief valve upon sudden pressure rise from an overturn or any other sudden pressure surge increase within the tank to increase the time before which the relief valve can vent to atmosphere. Such a snubber surge valve assembly, however, is exposed to the flow of gasses and/or liquids within the tank which can be affected by dirt and debris to prevent proper activation of the snubber surge valve assembly and relief valve.

It therefore would be desirable to provide a relief valve for overturn conditions of a storage tank which momentarily prevents opening of the relief valve upon overturn, but after a short period of time permits normal venting of the relief valve while the tank is still overturned and which is not exposed to gas and/or liquid flow from within the tank.

SUMMARY OF THE INVENTION

A storage tank relief valve apparatus for venting and relieving pressure within the storage tank which prevents venting for a short period of time when the relief valve is subjected to surge pressure created during overturn of the tank. The apparatus includes a sealed piston assembly for regulating movement of a spring biased poppet where the poppet is in cooperative engagement with the sealed piston assembly and a valve seat of an associated valve opening through which pressure within said tank can vent to ambient atmosphere so that the poppet can be activated by a predetermined pressure developed within the tank to overcome the spring bias and vent the pressure to ambient atmosphere. The piston assembly includes a piston head and a flow path through the piston head for flow of material therethrough within a closed piston chamber enclosing the piston head. A snubber valve assembly is included which is carried by the piston head and contained within the closed piston chamber. The snubber valve assembly includes a shut-off disc for momentarily closing the flow path of the piston head during initial overturn of the tank thereby momentarily preventing movement of the piston head within the chamber which in turn restricts movement of the poppet and prevents venting of any surge pressure built up within the tank during the overturn. The snubber valve assembly also includes a member for moving the shut-off disc to open the flow path after a predetermined time period during which any surge pressure is dissipated within the tank in order to permit movement of the piston assembly and the poppet and venting of the valve.

BRIEF DESCRIPTION OF THE DRAWINGS

FIG. 4 is an enlarged view of the snubber valve assembly of the invention, in partial section, taken along the line 4—4 of FIG. 3 in the direction indicated generally, illustrating the fluid flow paths into the housing of the snubber valve assembly;

FIG. 5 is an enlarged cross-sectional view taken along the line 5—5 of FIG. 4 in the direction indicated generally, illustrating the details of the housing, shut-off disc and associated spring of the snubber valve assembly, as well as the flow path therethrough during normal venting of the relief valve;

FIG. 6 is an enlarged cross-sectional view, similar to that of FIGS. 1 and 2, illustrating the overturn condition of the tank, relief valve and snubber valve assembly; and FIG. 7 is an enlarged cross-sectional view of the snubber valve, similar to that of FIG. 5, illustrating the overturn condition of the snubber valve shut-off disc of FIG. 6.

DESCRIPTION OF THE PREFERRED EMBODIMENT

Figure 2:
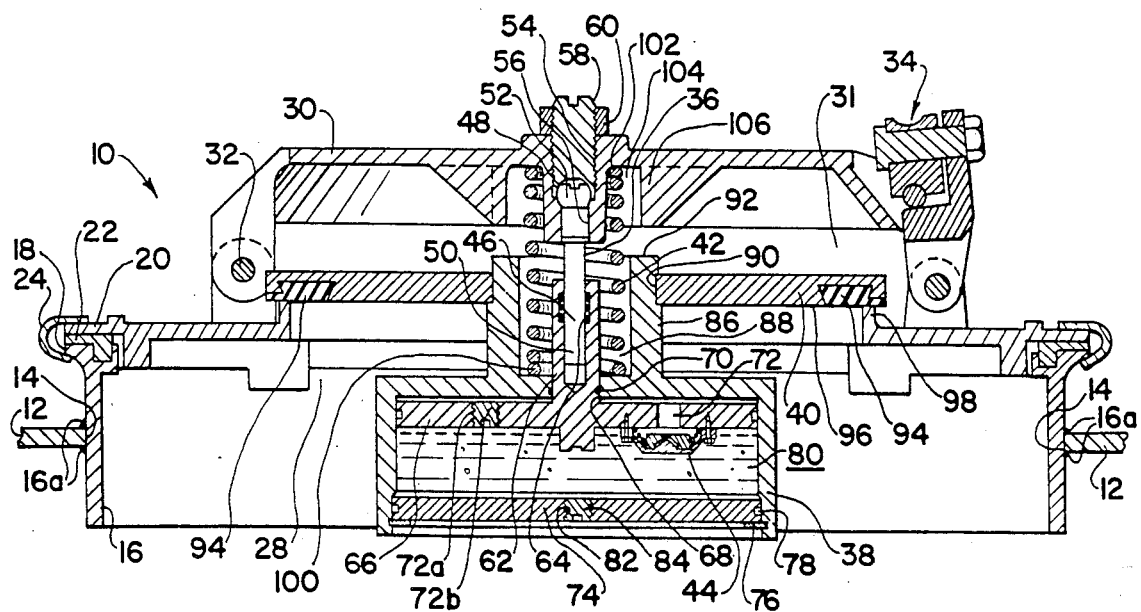
FIG. 2 is an enlarged cross-sectional view taken along the line 2—2 of FIG. 1 in the direction indicated generally, illustrating the relief valve in its closed position as well as the snubber valve assembly.

Referring to FIG. 2, a relief valve embodying the invention is designated generally by the reference numeral 10. The relief valve 10 typically is utilized with a storage tank 12 and is fitted within and overlies a manhole or opening 14 in the tank 12.

In order to secure the relief valve 10 to the tank 12, a weld ring or sleeve 16 is inserted within the manhole 14 and connected about its periphery to the tank 12, such as by welds 16a. The exterior end of the weld ring 16 includes a lip 18 which mates with a manhole cover 20, preferably with a sealing gasket 22 therebetween. The lip 18 and manhole cover 20 are secured together by a clamp ring 24 which is tightened with screws 26, illustrated in FIG. 1.

It is to be understood that the relief valve 10 can be utilized with a variety of storage tanks 12, including a tanker truck or the like, and its use is not limited to the material contained within the tank 12. Additionally, the relief valve 10 can be secured to the tank 12 in a variety of ways and, although the relief valve 10 preferably is constructed of metal, can be made of a variety of materials without departing from the teachings of the present invention.

Figure 1:
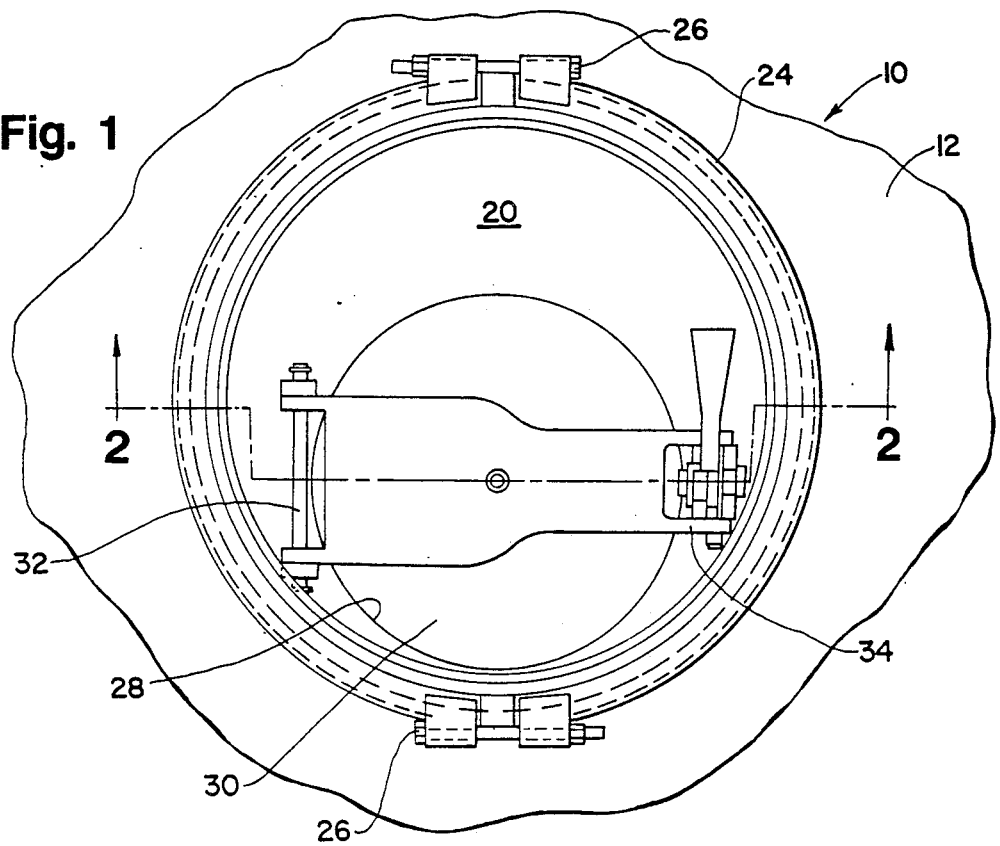
FIG. 1 is a top plan view of the relief valve of the invention connected to an opening in a storage tank.

As FIGS. 1 and 2 illustrate, the manhole cover 20 includes an aperture or valve opening 28 therethrough which can be opened and closed to provide venting of the tank 12 as will be described in detail below. Preferably, the relief valve 10 is utilized with a strongback 30 having one side which is connected to the manhole cover 20 with a hinge 32 and its opposite side being secured with a latch mechanism 34 so that the strongback 30 can be manually opened, if desired. The specific structure of the hinge 32 and the latch mechanism 34 and the safety features thereof are described in detail in U.S. Pat. No. 4,555,041 which has been incorporated herein by reference.

It is to be noted that, if desired, the relief valve 10 can be utilized with a strongback 30 which does not open merely by omitting the hinge 32 and latch mechanism 34. In such a situation, the strongback 30 can be directly secured to the manhole cover 20 in a variety of ways so long as the relief valve 10 functions as described herein.

In either event, the strongback 30 is positioned slightly above the manhole cover 20, preferably by the specific structure of the hinge 32 and latch mechanism 34, to provide a gap 31 between the manhole cover 20 and strongback 30. This gap 31 enables excess pressure within the tank 12 to release to atmosphere as will be described below.

As FIG. 2 illustrates, the relief valve 10 includes a piston 36, a piston casing 38, a poppet or fill cover 40, a pressure spring 42 and a snubber valve assembly 44. The specific size, shape and materials of the piston 36, piston casing 38, poppet 40, pressure spring 42 and snubber valve assembly 44 can vary.

The piston 36 includes a piston rod 46 which preferably is an elongate circular rod having a first end 48 and a second end 50. During operation of the relief valve 10, the piston 36 does not move. Thus, to anchor the piston 36 within the relief valve 10, the first end 48 of the piston rod 46 is fixed to the strongback 30. Preferably, the first end 48 of the piston rod 46 includes a stud 52 and the strongback 30 includes an aperture 54 having a reduced diameter portion 56 for seating of the stud 52 therein. During assembly, the second end 50 of the piston rod 46 is inserted through the aperture 54 and the reduced diameter portion 56 with the stud 52 being seated against the shoulder formed between the aperture 54 and the reduced diameter portion 56. A set screw 58 and jam nut 60 are utilized to secure the stud 52 within the strongback 30.

The second end 50 of the piston rod 46 includes a threaded portion thereon which is received within one end of an elongate sleeve 62 and is connected therein by a threaded insert 64. The end of the sleeve 62 opposite the piston rod 46 preferably is integrally connected to a piston head 66.

The piston casing 38 encloses the piston head 66 and includes an aperture 68 therethrough which accepts the sleeve 62 between the piston head 66 and the piston rod 46. Since the piston rod 46 is anchored, the casing 38 moves along the sleeve 62 with respect to the piston rod 46 and piston head 66. To provide a seal between the aperture 68 and sleeve 62, a gasket 70 is included about the internal periphery of the aperture 68. Preferably, both the piston head 66 and piston casing 38 are circular, but the shape can vary.

To assist in movement of the piston casing 38 with respect to the piston head 66 and to enable activation of the snubber assembly 44, the piston head 66 can include at least one orifice 72 therethrough. One or more additional orifices 72a can be provided, if desired, which can be closed with a plug 72b if they will not be utilized with an additional snubber assembly 44.

The end of the piston casing 38 opposite the aperture 68 through which the sleeve 62 extends is closed by a cap 74. The cap 74 is secured by a retaining ring 76 and sealed against the piston casing 38 with an O-ring 78.

Preferably, the piston 36 is a hydraulic type. Accordingly, the casing 38 is filled with hydraulic fluid 80 which can be added or drained through an oil orifice 82 in the cap 74 which can be sealed with a plug 84.

The piston casing 38 also includes an elongate casing sleeve 86 which is integrally formed thereto and extends about the aperture 68 and the sleeve 62 at a predetermined distance therefrom. Thus, an annular channel 88 is formed between the casing sleeve 86 and the piston sleeve 62.

The poppet 40 includes a central aperture 90 which is connected about the external periphery of the casing sleeve 86 proximate a distal end 92 of the casing sleeve 86. Preferably, the poppet 40 is in the form of a circular disc including a gasket 94 positioned about its underside 96 for sealing engagement with a valve seat 98 formed in the manhole cover 20.

Figure 3:
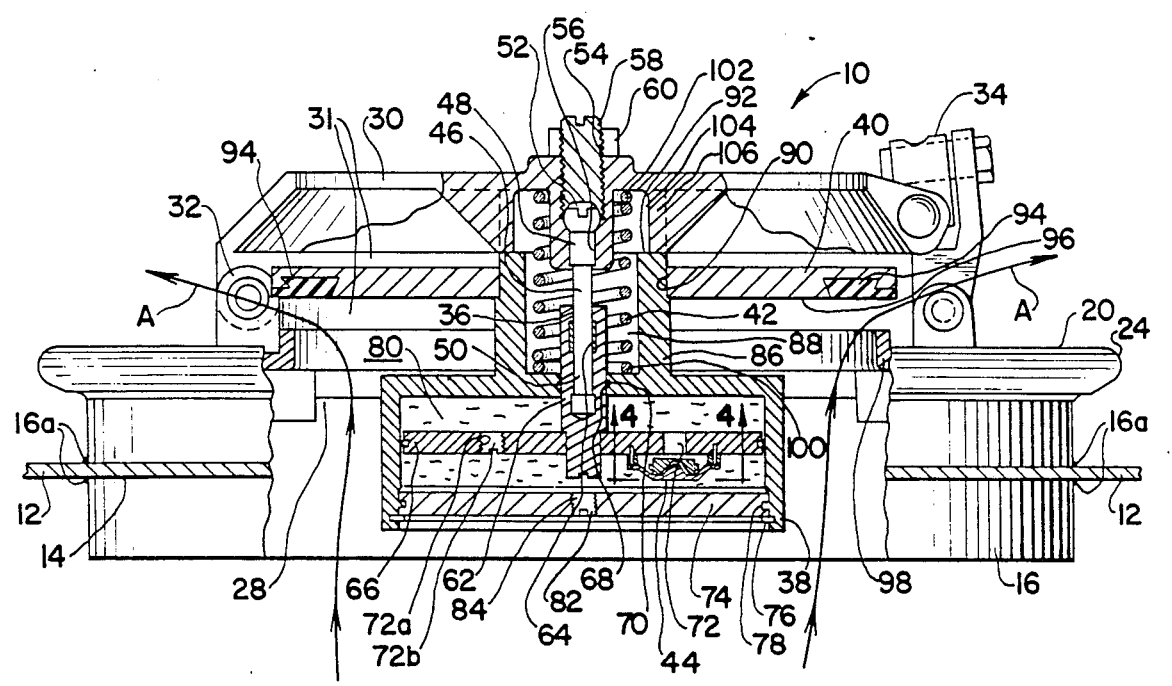
FIG. 3 is an enlarged cross-sectional view, similar to that of FIG. 1, illustrating the relief valve and snubber valve assembly during normal venting.

Briefly, as the piston casing 38 moves along the sleeve 62 on the piston rod 46, the poppet 40 likewise moves and the gasket 94 moves from the closed position against the valve seat 98, illustrated in FIG. 2, to the open position away from the valve seat 98, as illustrated in FIG. 3 to provide normal venting as will be described in more detail below.

The pressure spring 42 provides a bias against the piston casing 38 and poppet 40 and includes a first end 100 and a second end 102. The first end 100 is positioned within the annular channel 88 formed by the casing sleeve 86 and extends around the sleeve 62 on the piston rod 46. The second end 102 similarly is positioned within another annular channel 104 formed by an annular sleeve 106 which is integrally formed with the strongback 30.

To provide normal venting of the relief valve 10, pressure within the tank 12 builds against the poppet 40 through the aperture 28 in the manhole cover 20. The pressure spring 42 is selected to provide a bias to the poppet 40 through the piston casing 38 which keeps the poppet 40 sealed against the valve seat 98 until a desired pressure is obtained within the tank 12. Upon attaining such a pressure, the poppet 40 moves the piston casing 38 along the sleeve 62 on the piston rod 46 against the force of the pressure spring 42. Accordingly, the gasket 94 on the poppet 40 moves from the closed position against the valve seat 98, as illustrated in FIG. 2, to the open position away from the valve seat 98, as illustrated in FIG. 3. Excess pressure thus vents out of the tank 12 along flow lines "A" illustrated in FIG. 3 through the gap 31 between the strongback 30 and manhole cover 20. When pressure is sufficiently reduced within the tank 12, the bias provided by the pressure spring 42 moves the gasket 94 of the poppet 40 back into sealed engagement with the valve seat 98 as illustrated in FIG. 2.

As described aboe, in the event of an overturn of the tank 12, a large but brief surge pressure can be created within the tank 12. If normal venting of the relief valve 10 as described above is permitted to occur during the existence of this surge pressure, large quantities of liquid could be sprayed out of the relief valve 10 creating a safety hazard.

The snubber valve assembly 44 momentarily prevents the relief valve 10 from venting against a surge pressure which may be created from an overturn condition of the tank 12 for a short period of time until the surge pressure typically is dissipated. Thereafter, if excess pressure within the tank 12 is still present, the snubber valve assembly 44 permits normal venting of the relief valve 10 while the tank 12 is still in its overturned position.

As FIGS. 2 and 3 illustrate, the snubber valve assembly 44 is positioned within the piston casing 38. As FIG. 4 illustrates, the snubber valve assembly 44 includes a dome shaped housing 108 which includes a shut-off disc 110 and a spring 112 mounted therein. The housing 108 is positioned overlying the orifice 72 in the piston head 66 and is connected to the piston head 66 by screws 114 which extend through apertures 116 formed in ears 118 on opposite sides of the housing 108.

As FIGS. 4 and 5 illustrate, to enable hydraulic fluid 80 to flow through the orifice 72, the housing 108 is cut away to form at least two semi-circular slots 120 about its periphery proximate the piston head 66, a respective slot 120 extending between the ears 118 on opposite sides of the housing 108. Thus, under normal venting as illustrated in FIG. 3, the piston casing 38 can move with respect to the piston head 66 since hydraulic fluid 80 is permitted to flow through the orifice 72 in the piston head 66 and through the slots 120 in the housing 108 of the snubber assembly 44 as illustrated by flow lines "B" in FIG. 5. Alternatively, the slots 120 can be replaced with one or more through apertures (not illustrated).

The interior surface of the housing 108 includes a conical projection 122 which, in the upright condition of the tank 12, has its distal end seated within a corresponding conical recess 124 formed in the shut-off disc 110. The spring 112 is mounted about the external periphery of the shut-off disc 110 with a first end 126 of the spring 112 being seated against a shoulder 128 on the outer periphery of the shut-off disc 110 and a second end 130 positioned against the piston head 66. The second end 130 of the spring 112 can be connected to the piston head 66, if desired.

When the tank 12 is overturned, for example, in the direction of arrow "C" in FIGS. 6 and 7, the snubber valve assembly 44 reacts due to inertia and gravity to prevent any surge pressure which may be present in the tank 12 from activating the relief valve 10. Thus, when the tank 12 is overturned, the shut-off disc 110 initially moves downward due to inertia and gravity with respect to FIG. 7 against the force of the spring 112. The conical recess 124 of the shut-off disc 110 rides along the conical projection 122 of the housing 108, thereby forcing the shut-off disc 110 to the right with respect to FIG. 7 and sealing off the orifice 72 in the piston head 66. This prevents hydraulic fluid 80 from passing through the orifice 72 and prevents the piston casing 38 from moving in response to the increase in pressure exerted on the poppet 40. Thus, the relief valve 10 does not exhibit normal venting as described above.

After a prescribed period of time during which the surge pressure is permitted to dissipate within the tank 12, the spring 112 is able to recover and gradually move the shut-off disc 110 upward with respect to FIG. 7 and unblock the orifice 72. At this point, if any excess pressure remains above the pressure which the pressure spring 42 is set, the relief valve 10 can vent normally while the tank 12 still is overturned. The period of time during which the shut-off disc 110 remains blocking the orifice 72 and preventing normal venting is determined by the size and strength of the spring 112.

It is to be noted that, although only one snubber valve assembly 44 per relief valve 10 is illustrated, the relief valve 10 can be utilized with more than one snubber valve assembly 44, if desired In such a situation, an additional snubber valve assembly 44 can be connected in communication with each additional orifice 72a.

Modifications and variations of the present invention are possible in light of the above teachings. A specific dimension, material or construction is not required so long as the assembled device is able to function as herein described. It is therefore to be understood that within the scope of the appended claims, the invention may be practiced otherwise than as specifically described.

What is claimed and desired to be secured by letters patent of the United States is:

1. A valve for relieving pressure from within a storage tank at a predetermined tank pressure through an opening in the tank comprising:

mounting means for connecting said valve in sealed engagement with said opening and providing a valve opening and an associated valve seat, said valve opening being in communication with ambient atmosphere and the pressure within said tank;

a piston assembly having a piston rod and a piston head on one end of said piston rod, the end of said piston rod opposite said piston head being connected to said mounting means;

a poppet positioned for engagement with said valve seat and exposed to said pressure within said tank through said valve opening to close and open said valve opening upon movement of said poppet in response to the predetermined pressure within said tank;

a closed piston chamber connected to said poppet and enclosing said piston head with said piston rod extending through an aperture in said chamber and in sealed sliding engagement therewith, said chamber being movable about said piston head and along said piston rod from a first position in which said poppet closes said valve seat and a second position in which said poppet opens said valve seat;

bias means connected between said mounting means and said chamber for urging said chamber and said poppet into said first position, said bias means providing a predetermined force which, when overcome by the predetermined pressure within said tank, enables movement of said chamber and said poppet against said bias means to said second position to open said valve opening; and surge control means for momentarily preventing movement of said chamber with respect to said piston head during overturn of said tank when said poppet can be exposed to a surge pressure greater than the predetermined pressure, said surge control means thereby preventing said poppet from opening said valve seat and venting any surge pressure from within said tank, said surge control means after a predetermined time period permitting movement of said chamber with respect to said piston head while said tank is still in said overturned state thereby enabling said poppet to vent any remaining pressure within the tank above said predetermined pressure.

2. The valve as defined in claim 1 wherein said piston chamber includes hydraulic fluid.

3. The valve as defined in claim 1 wherein said piston head is in sealed sliding engagement with said closed piston chamber and includes at least one orifice therethrough for providing a flowpath through the piston head to enable movement of said chamber with respect to said piston head, said surge control means including a snubber valve assembly positioned within said closed piston chamber for momentarily closing said orifice and thereby momentarily preventing movement of said chamber with respect to said piston head.

4. The valve as defined in claim 3 wherein said snubber valve assembly includes a shut-off disc which is activated by inertia to engage said shut-off disc with said orifice and provide said momentary closing of said orifice and includes spring bias means to disengage said shut-off disc from said orifice after said predetermined time period.

5. The valve as defined in claim 3 wherein said snubber valve assembly includes a housing connected to said piston head and overlying said orifice, said housing including a conical projection whose distal end faces said orifice and at least one opening through said housing, said housing further including a shut-off disc having a first planar side for overlying engagement and sealing of said orifice and a conical recess on a second side for cooperative engagement with said conical recess of said housing and a spring connected between said first side of said shut-off disc and said piston head.

6. The valve as defined in claim 1 wherein said mounting means include a manhole cover which is connected to said tank opening and provides said valve opening and said valve seat as well as a strongback which includes means for mounting said strongback to said manhole cover at a predetermined distance therefrom outside of said tank, the end of said piston rod opposite said piston head being connected to said strongback and said bias means include a spring connected at a first end to said strongback and at a second end to said piston chamber.

7. The valve as defined in claim 6 wherein said means for mounting said strongback include a hinge assembly mounting at least one portion of said strongback to said manhole cover and a latch mechanism on a portion of said strongback opposite said hinge assembly to manually open said valve opening.

8. A tank valve apparatus comprising:

a sealed piston assembly for regulating movement of a spring biased poppet, said poppet being in cooperative engagement with said sealed piston assembly and a valve seat of an associated valve opening, said opening being in communication with ambient atmosphere and pressure within a tank to which said valve apparatus is to be connected, said poppet being activated by a predetermined pressure developed within said tank to overcome said spring bias and vent said pressure to ambient atmosphere, said piston assembly including a piston head and flow path means through the piston head for flow of material therethrough within a closed piston chamber enclosing said piston head; and a snubber valve assembly carried by said piston head and contained within said closed piston chamber, said snubber valve assembly including a shut-off disc for momentarily closing said flow path means of said piston head during an initial overturn of said tank thereby momentarily preventing movement of said piston head within said chamber which in turn restricts movement of said poppet and prevents venting of any surge pressure built up within said tank during said overturn, said snubber valve assembly including means for moving said shut-off disc to open said flow path means after a predetermined time period during which any surge pressure is dissipated within said tank in order to permit movement of said piston assembly and said poppet and venting of said valve.

* * * * *